March 11, 1952 — K. F. PITTMAN — 2,588,870
BATTERY HOLD-DOWN
Filed Feb. 18, 1948 — 3 Sheets-Sheet 3
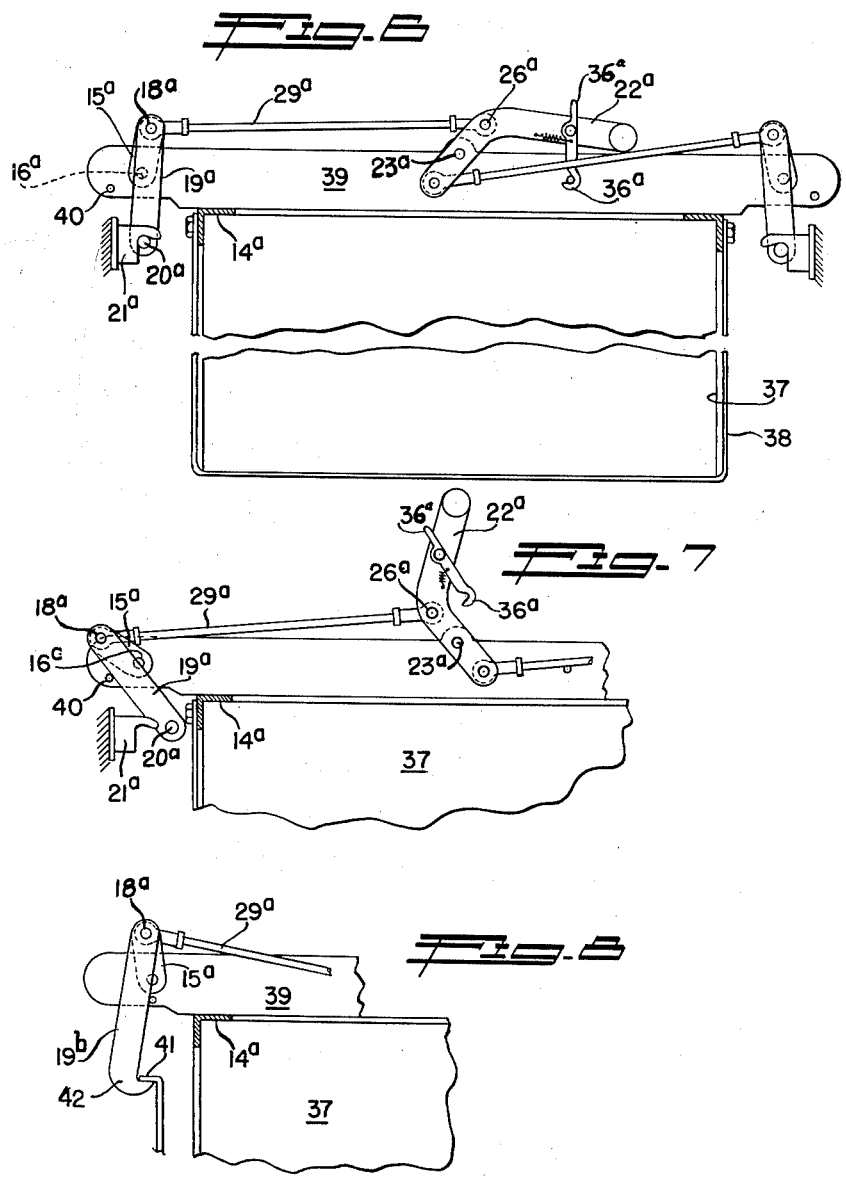
INVENTOR.
KENNETH F. PITTMAN
BY
George C. Sullivan
Agent Patented Mar. 11, 1952

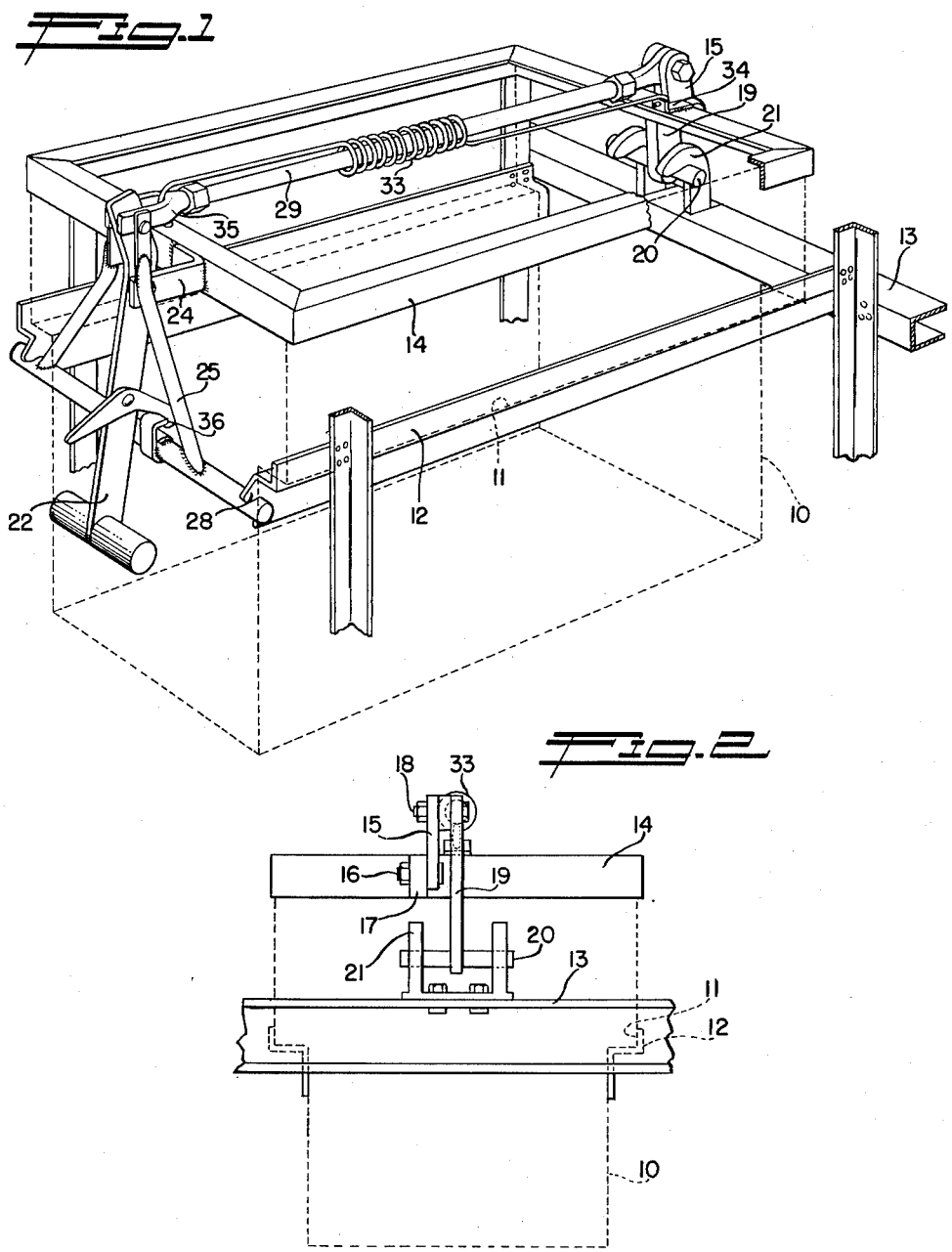

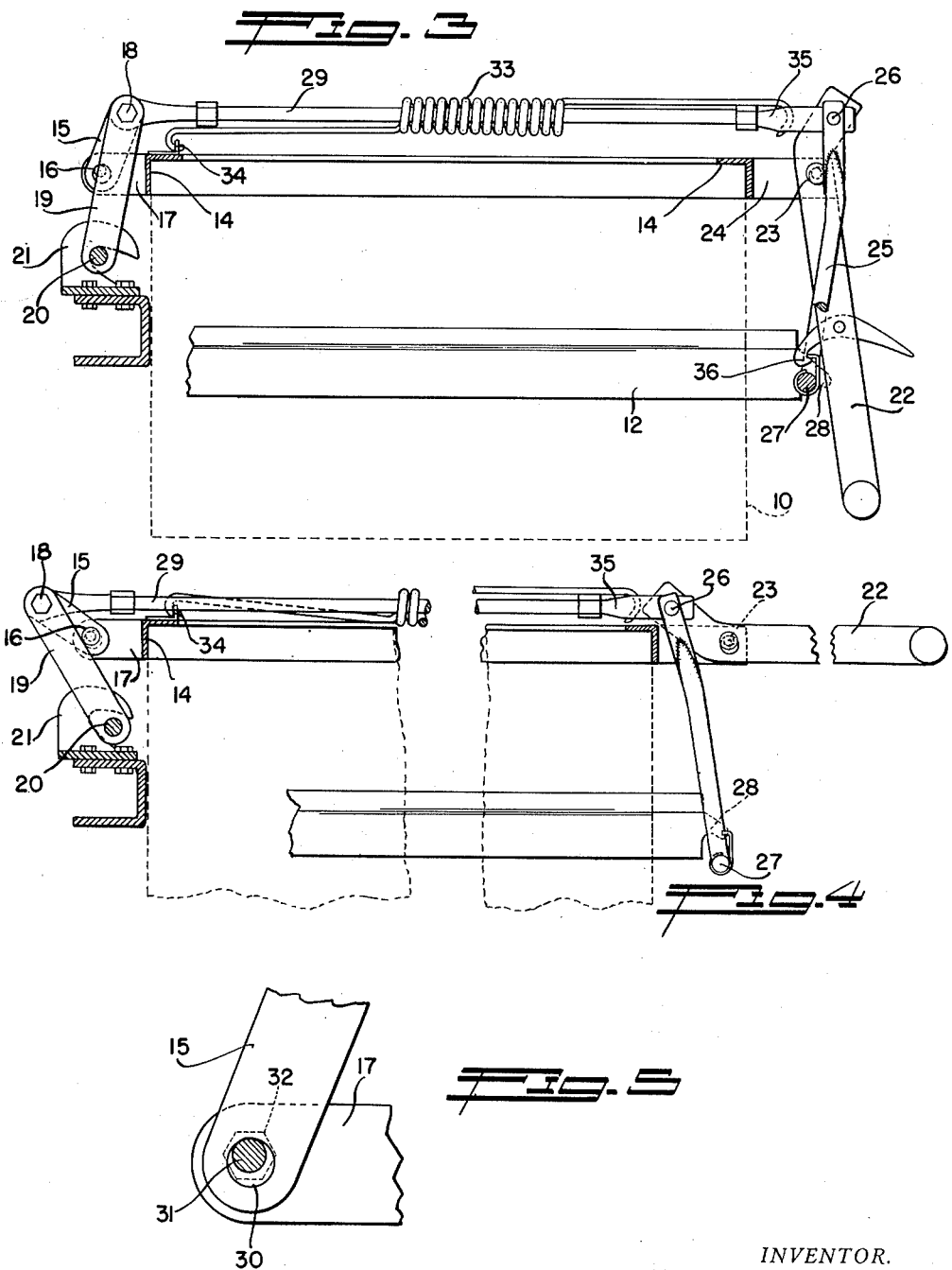

2,588,870

UNITED STATES PATENT OFFICE 2,588,870

BATTERY HOLD-DOWN

Kenneth F. Pittman, North Hollywood, Calif., assignor to Lockheed Aircraft Corporation, Burbank, Calif.

Application February 18, 1948, Serial No. 9,299

3 Claims. (Cl. 180—68.5)

This invention relates to an improved battery holddown and disconnect to facilitate the removal and replacement of heavy batteries in vehicles, aircraft, and the like.

It is an object of the invention to provide an improved battery holddown and quick disconnect that will be operable without requiring the use of tools or the operation of mechanisms requiring a delicate sense of touch; as to facilitate battery removal in severe weather by a mechanic wearing heavy arctic clothing and gloves. In arctic use of vehicles or aircraft, for example, the battery must be removed to a warm place while the vehicle or aircraft is parked at low temperatures, and it is impossible to work barehanded, and difficult to operate and adjust tools, etc., when wearing heavy gloves.

It is also an object of this invention to provide an improved battery receptacle and holddown that can be adjusted to variations in a particular battery and will thereafter release and restore the adjusted holddown pressure during repeated removals and replacements of the battery.

It is a further object of this invention to provide an improved device of the character described facilitating placement and removal of heavy batteries in cramped or awkward locations.

Other and further objects of this invention will appear as the description proceeds, and it will be understood that my invention is applicable to such changes and variations as fall within the scope of the appended claims.

In the accompanying drawings

Figure 1 is a perspective view of a device embodying the pull-out features of this invention as applied to a battery shown in dotted lines.

Figure 2 is a rear end view of the device as shown in Figure 1.

Figure 3 is a side view thereof in the locked position, reversed relative to Figure 1.

Figure 4 is a fragmentary view similar to Figure 3 showing the device in the unlocked position.

Figure 5 is an enlarged detail of the eccentric pivot used to adjust the device to variations in battery height.

Figure 6 is a modified form of my invention suitable for use when it is desired to lift the battery out of a compartment.

Figure 7 is a fragmentary view showing the device of Figure 6 in the disengaged position.

Figure 8 is a further modification embodying reversal of parts.

As shown in Figures 1 to 4 inclusive of the drawings a battery case 10 is indicated by dotted lines which in this embodiment has side shoulders 11 intended to support the battery for clamping and/or sliding movement in rails 12 forming part of the structure of the battery compartment of a vehicle or airplane. In the case of a sliding battery mount the battery will be withdrawn towards the left in Figure 1; but it could be lifted out after removal of the holddown if so desired, as is present practice in automotive battery installations. In the sliding version the battery is shoved back on the rails 12 until it bottoms as by striking part of the vehicle structure, such as a cross member 13.

A conventional angular frame 14 is adapted to embrace the top edges of the battery 10, and my invention relates to a quick disconnecting clamping and locking arrangement adapted to press down on the frame 14 to clamp and lock the battery 10 between the rails 12 and the frame 14. To this end, I provide front and rear overcenter toggle mechanisms pivoted to the frame 14 and adapted to engage fixed parts of the vehicle or battery compartment structure, and interconnected to each other for simultaneous operation by a single handle.

As shown in Figures 1 to 4, and with special reference to Figure 2, the rear toggle mechanism comprises a short link 15 pivoted at 16 at its lower end to a lug 17 on the frame 14. The upper end of the link 15 is in turn pivoted at 18 to the upper end of a longer link 19 the lower end of which carries a crosspin 20 engageable with hooks 21 secured to the cross member 13. The hooks 21, as best shown in Figures 3 and 4 are so curved that the pin 20 does not disengage in the overcenter or locked position of Figure 3 and tends to ride out of the hook in the open or disengaging position of Figure 4.

The front end toggle mechanism embodies a hand lever 22 pivoted at 23 to a lug 24 on the frame 14, and a locking frame 25 pivoted at 26 to the hand lever 22, a cross bar 27, forming the lower part of the locking frame, being adapted to engage under hooks 28 associated with fixed vehicular structure such as the outer ends of the rails 12. The rear pivot 18 and the front pivot 26 are connected by a push-pull rod 29 for simultaneous actuation of both toggle mechanisms upon pivotal motion of the hand lever 22 from the position of Figure 3 to that of Figure 4, or vice versa.

In order to be able to originally adjust the frame 14 to impose a desired pressure on the battery and to readjust the frame to suit another or replacement battery if so required, the two pivots 16 and 23 may desirably be arranged as eccentrically adjustable relative to their respective frame mountings, as shown in detail in Figure 5. Such a pivot may have an eccentric or cam portion 30 rotatable in the short link 15 and a shank portion 31 adjustably locked in the frame lug 17 by a nut 32, rotation of the cam 30 and shank 31 in the lug 17 serving to adjust the frame 14 up or down relative to the fixed structure of the battery compartment or side rails 12.

As a matter of convenience, a spring 33 is assembled on the push-pull rod 29 with its ends respectively engaged with the frame 14 at 34 and with the push-pull rod clevis 35 adjacent the pivot 26. The purpose of this spring is to hold the hand lever horizontal, in the position of Figure 4, when the battery is released and ready to be drawn out on its rails 12.

A latch 36 is provided to lock the hand lever 22 to the frame cross bar 27, this latch locking the two toggle linkages in the overcenter position of Figure 3.

The modification of Figures 6 and 7 is intended to adapt my invention to a battery 37 intended to be lifted out of its compartment. As many parts are identical in principle with those of the first described version, I shall describe equivalent features of the modification using primed reference numerals, for ease of cross reference. A frame 14$^a$ embraces the top of the battery as before, and may be secured to the battery by a strap 38 if so desired. The frame 14$^a$ has a longitudinal bar 39 secured thereto the ends of which project beyond the battery to support pivots 16$^a$ for short links 15$^a$, the upper ends of which are pivoted at 18$^a$ to the upper ends of long links 19$^a$ having cross pins 20$^a$, these links being used at both ends of the bar 39 and corresponding to the rear toggle mechanism of Figure 2. If desired, the eccentric pivot of Figure 5 may be used as hereinbefore described.

A hand lever 22$^a$ is pivoted at 23$^a$ to the bar 39 and has duplicate push-pull rods 29$^a$ pivoted thereto at spaced pivots 26$^a$ and connected to the pivots 18$^a$ of the toggle mechanisms. The hand lever 22$^a$ may be held in the position of Figure 6 by a latch 36$^a$. The pivots 26$^a$ are so disposed relative to the lever pivot 23$^a$ that lifting the hand lever to its vertical position, shown in Figure 7, pushes the upper pivot 18$^a$ of the toggle links outwardly. Pins 40 on the bar then cause the long links 19$^a$ to swing their pins 20$^a$ clear of hooks 21$^a$ fastened to fixed structure of the vehicle, as shown in Figure 7. With the hand lever 22$^a$ vertical it may be used to lift the battery out of its compartment if the frame 14$^a$ is secured to the battery as by the strap 38, or the frame 14$^a$ may be lifted off the battery and a conventional battery carrier used to lift the battery.

Figure 8 illustrates the links 15$^a$ and 19$^b$ arranged to open by a reverse movement, by transposing in Figures 6 and 7 the pivots 26$^a$ of the push-pull rods 29$^a$ on the hand lever 22$^a$, an arrangement convenient to use when a battery compartment has suitable means such as a flange 41 which can be engaged by a hook 42 formed on the lower end of the long link 19$^b$ to replace the pin 20$^a$ of Figures 5 and 6.

In the several versions of my invention described above the battery is clamped in its compartment by operating toggle mechanisms to overcenter positions by means of a hand lever and the hand lever when in its disengaged or released position also serves to withdraw the battery from its compartment. While I have chosen to illustrate my invention as applied to storage batteries for vehicles, it will be understood that my invention is equally applicable to retaining other portable equipment in position.

I claim as my invention:

1. A battery holddown comprising the combination with a battery compartment, a battery adapted to fit therein, and a frame adapted to embrace the battery, of toggle means releasably interconnecting said frame with fixed parts of the battery compartment, said toggle means including a first link having one end pivoted to said frame; a second link having one end releasably engaging a fixed element in said battery compartment, said first and second links being pivoted to each other at their other ends, said links being so proportioned that the second link disengages said fixed part when the first link is moved to one side of its pivot with said frame and to lockingly engage said fixed part when the first link is moved to the other side of its pivot with said frame; and handle means pivotally mounted on said frame for operating said toggle means to engage the frame with or disengage it from the battery compartment and adapted to facilitate the withdrawal of the frame and battery embraced thereby from the compartment when the frame is disengaged therefrom.

2. A holddown device for use in combination with a removable unit and a compartment therefor, comprising a frame engaging said removable unit, anchor means associated with the compartment, toggle means carried by said frame having an overcenter position and adapted to releasably engage said anchor means, handle means pivotally mounted on said frame for operating said toggle means to engage the frame with or disengage it from the compartment and adapted to facilitate the withdrawal of the frame and removable unit engaged thereby from the compartment when the frame is disengaged therefrom, and means resiliently supporting said hand lever in the toggle released position, whereby to facilitate handling said removal unit.

3. A battery holddown comprising the combination with a battery compartment, a battery adapted to fit therein, rails associated with the compartment adapted to slideably receive the battery, and a frame adapted to embrace the battery, toggle means releaseably interconnecting said frame with fixed parts of the battery compartment; said toggle means including a first link having one end pivoted to said frame, a second link having one end releaseably engaging a fixed element in said battery compartment, said first and second links being pivoted to each other at their other ends, said links being so proportioned that the second link disengages said fixed part when the first link is moved to one side of its pivot with said frame and to lockingly engage said fixed part when the first link is moved to the other side of its pivot with said frame; and handle means pivotally mounted on the end of said frame for operating said toggle means to engage the frame with or disengage it from the battery compartment and adapted to facilitate the withdrawal of the frame and battery embraced thereby from the compartment when the frame is disengaged therefrom.

KENNETH F. PITTMAN.

REFERENCES CITED

The following references are of record in the file of this patent:

UNITED STATES PATENTS

| Number | Name | Date |
|---|---|---|
| 647,251 | Condict | Apr. 10, 1900 |
| 862,908 | Hawkinson | Aug. 13, 1907 |
| 2,159,890 | Ferguson | May 23, 1939 |
| 2,442,266 | Davis | May 25, 1948 |

FOREIGN PATENTS

| Number | Country | Date |
|---|---|---|
| 74,346 | Switzerland | July 2, 1917 |
| 397,193 | France | Apr. 30, 1909 |